United States Patent
Douglas et al.

(10) Patent No.: US 6,628,697 B1
(45) Date of Patent: Sep. 30, 2003

(54) SUBSCRIBER UNIT RANGING IN A POINT TO MULTIPOINT SYSTEM

(75) Inventors: Bretton Douglas, Sunnyvale, CA (US); Derek Gerlach, Mountain View, CA (US); Santosh Anikhindi, San Jose, CA (US); Vincent K. Jones, IV, Redwood Shores, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/422,832

(22) Filed: Oct. 21, 1999

(51) Int. Cl.[7] ............................................. H04L 27/30
(52) U.S. Cl. .................. 375/139; 375/364; 375/366; 370/510; 370/514; 370/520
(58) Field of Search .................. 375/130, 139, 375/145, 149, 335, 354, 364, 366; 370/503, 510, 514, 520, 527, 350, 324

(56) References Cited

U.S. PATENT DOCUMENTS

| | | | | |
|---|---|---|---|---|
| 4,468,792 A | * | 8/1984 | Baker et al. ................. | 359/154 |
| 5,105,294 A | * | 4/1992 | Degura et al. ............. | 439/76.1 |
| 5,982,808 A | | 11/1999 | Otto ........................... | 375/204 |
| 5,995,570 A | * | 11/1999 | Onvural et al. ............. | 375/356 |
| 6,026,074 A | * | 2/2000 | Stadler et al. ......... | 370/395.62 |
| 6,047,181 A | | 4/2000 | Suonvieri ................... | 455/440 |
| 6,236,365 B1 | | 5/2001 | LeBlanc et al. ............ | 342/457 |
| 6,249,252 B1 | | 6/2001 | Dupray ........................ | 342/450 |
| 6,304,619 B1 | * | 10/2001 | Citta et al. .................. | 375/343 |
| 6,396,866 B1 | * | 5/2002 | Upton et al. ................ | 375/139 |
| 6,418,158 B1 | * | 7/2002 | Vishwanath et al. ........ | 375/139 |
| 6,477,181 B1 | * | 11/2002 | Fujimori et al. ............ | 370/476 |

FOREIGN PATENT DOCUMENTS

| WO | WO 96/02990 | * | 2/1996 |
|---|---|---|---|
| WO | WO 96/19056 | * | 6/1996 |

OTHER PUBLICATIONS

"Data–over–cable services interface specifications", 1997, Radio Frequency Interface Specification, Cable Television Laboratories.

* cited by examiner

*Primary Examiner*—Stephen Chin
*Assistant Examiner*—Dac V. Ha
(74) *Attorney, Agent, or Firm*—Ritter, Lang & Kaplan LLP

(57) ABSTRACT

A chirp waveform is employed in establishing timing synchronization between nodes of a data communication network. In one embodiment, the chirp waveform is combined with a waveform modulated with data to form a synchronization waveform. The receiver of the synchronization waveform determines an alignment of the chirp waveform to a template chirp waveform to synchronize timing between nodes.

20 Claims, 8 Drawing Sheets

SUBSCRIBER UNIT RANGING IN A POINT TO MULTIPOINT SYSTEM

BACKGROUND OF THE INVENTION

The present invention relates to digital communication system and more particularly to systems and methods for synchronizing timing between nodes of a digital communication system.

In order to communicate digital data, it is typically necessary to establish one or more forms of timing synchronization between the transmitter and the receiver. For example, in certain systems such as OFDM (orthogonal frequency division multiplexing) systems, data is transmitted in successive bursts and it is necessary to establish a common understanding between a transmitter and a receiver of the time boundaries between bursts. In a TDMA (time division multiple access) system, shared access to a common transmission medium is implemented by dividing the time domain into successive time slots or frames that are allocated to individual transmitters. Nodes of a TDMA digital communication system must establish a shared understanding of the boundaries between frames. In a point to multipoint TDMA communication system where multiple subscriber units exchange data with a common hub or central access point a part of determining the TDMA frame boundaries is establishing round trip propagation delay between the central access point and each subscriber unit in a process known as ranging.

One exemplary ranging protocol is defined by the MCNS protocol developed for cable modem networks. The MCNS protocol is described in the Data-over-Cable Service Interface Specifications, Radio Frequency Interface Specifications, SP-RFI-I04-980724, (Cable Television Laboratories, 1997), the contents of which are herein incorporated by reference.

MCNS allocates contiguous sets of scheduled frames as initial ranging windows in which new subscriber units may transmit a synchronization waveform upstream to the central access point. The central access point measures the time delay between the protocol-defined beginning of the ranging window and the arrival time of the synchronization waveform. This time difference is then communicated to the subscriber unit so that the subscriber unit advances its timing appropriately to have its transmissions arrive within the assigned frame boundaries.

In order to facilitate accurate measurement of the synchronization waveform arrival time at the central access, the synchronization waveform should have several desired characteristics. The synchronization waveform should have a well defined peak in its autocorrelation signal. The synchronization waveform should be time limited so that it fits within the defined ranging window. The spectrum of the synchronization signal should be well confined within a limited frequency allocation. Furthermore, it is also desirable that the synchronization waveform be easily generated.

SUMMARY OF THE INVENTION

According to the present invention, a chirp waveform may be employed in establishing timing synchronization between nodes of a data communication network. In one embodiment, the chirp waveform is combined with a waveform modulated with data to form a synchronization waveform to be transmitted. The receiver of the synchronization waveform determines an alignment of the chirp waveform to a template chirp waveform to synchronize timing between nodes.

A first aspect of the present invention provides a method for operating a first node of a digital communication system that includes the first node and a second node. The method synchronizes timing of the second node to timing of the first node. The method includes: transmitting a synchronization waveform including a chirp waveform from the first node to the second node and transmitting data from the first node before the synchronization waveform and after the synchronization waveform.

A second aspect of the present invention operates in a digital communication system including a first node and a second node. The method synchronizes timing of the second node to timing of the first node. The method includes receiving a synchronization waveform from the first node. The synchronization waveform includes a chirp waveform. The method further includes determining an alignment of the chirp waveform to a template chirp waveform to synchronize timing of the second node to timing of the first node.

Further understanding of the nature and advantages of the invention herein may be realized by reference to the remaining portions of the specification and the attached drawings.

DESCRIPTION OF SPECIFIC EMBODIMENTS

Figure 1:
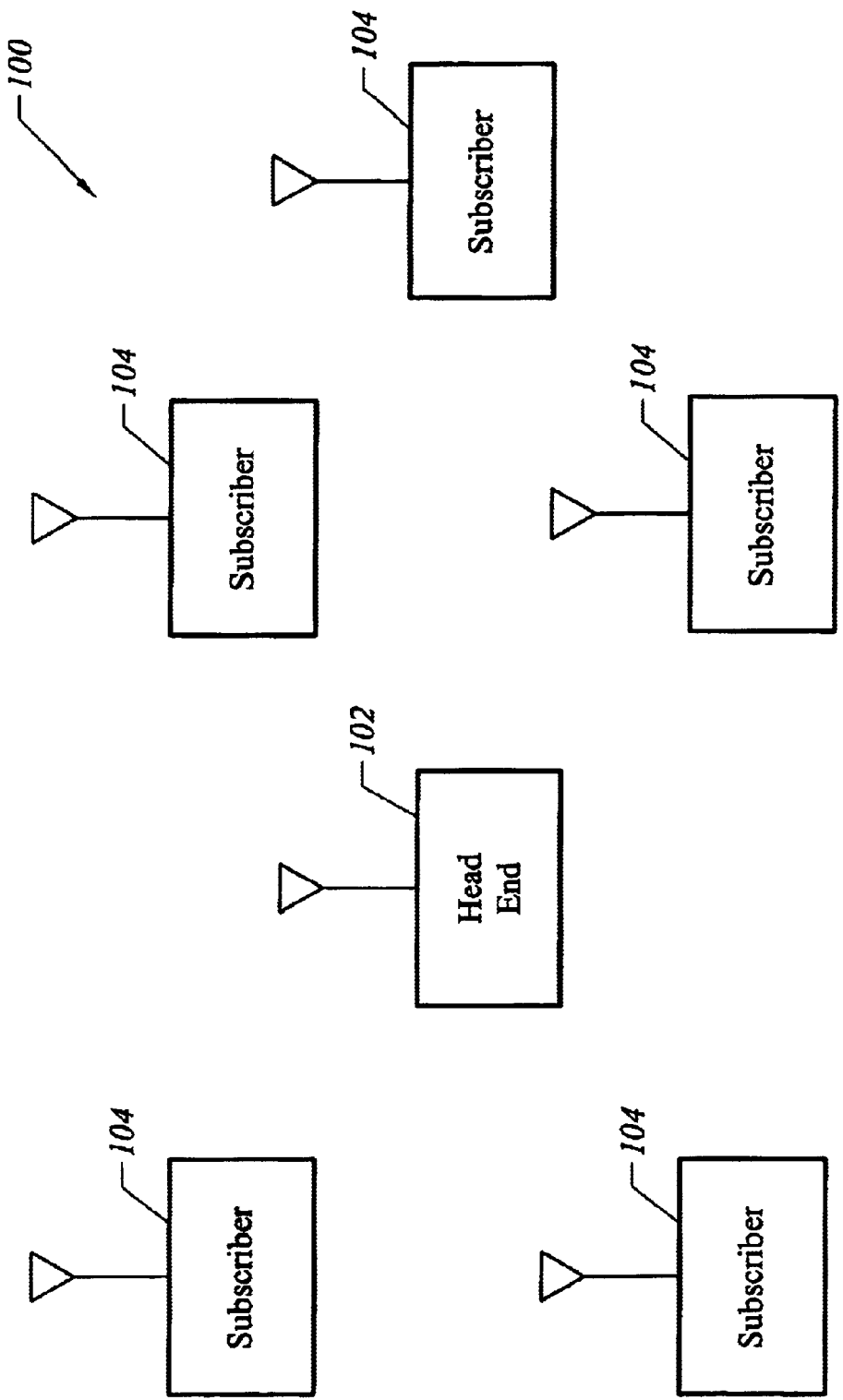
FIG. 1 depicts a point to multipoint communication network.

FIG. 1 depicts a point to multipoint wireless communication network 100 suitable for implementing one embodiment of the present invention. Although the present invention is illustrated here with reference to a point to multipoint wireless network, the present invention may be applied to any suitable data communication network.

Network 100 includes a central access point or head end 102 and multiple subscriber units 104. All communication is typically either to or from central access point 102. Communication from central access point 102 to one or more of subscriber units 104 is herein referred to as downstream communication. Communication from any one of subscriber units 104 to central access point 102 is herein referred to upstream communication. Alternatively, subscriber units 104 may communicate directly with one another. In one embodiment, different frequencies are allocated to upstream and downstream communication. In an alternative embodiment, upstream and downstream communication are multiplexed in the time domain on a single frequency.

To coordinate the operation of point to multipoint wireless communication network 100, a medium access control (MAC) protocol is provided. An exemplary MAC protocol that has been developed for data over cable systems but may also be applied to wireless systems is the so-called MCNS protocol described in the Data-over-Cable Service Interface Specifications, Radio Frequency Interface Specification, SP-RFI-I04-980724, (Cable Television Laboratories, 1997), the contents of which are herein incorporated by reference.

MCNS employs a time domain multiple access (TDMA) scheme to allocate access to one or more shared upstream frequencies among the multiple subscriber units 104. The TDMA scheme divides the time domain for each shared upstream frequency into frames. Each frame is a unit of time allocable to a subscriber unit. Each subscriber unit transmits data upstream only within frames that have been allocated to it.

In order to implement TDMA operation, central access point 102 and subscriber units 104 must have a shared understanding of system timing so that when a subscriber unit transmits at a particular frame the beginning and end of that frame as understood by the subscriber unit will be the same as the beginning and end as understood by the central access point. This shared understanding of system timing should take into account propagation delay between the subscriber unit and central access point. Each subscriber unit must advance its own timing to reflect the delay that its transmission will encounter before reaching the central access point.

Timing between central access point 102 and each subscriber unit 104 is synchronized via a MAC protocol process known as ranging. Each subscriber unit 104 is ranged independently to coordinate its timing to that of central access point 102. The ranging process may be understood to include two parts, initial acquisition and maintenance. Acquisition refers to the process that occurs when a subscriber unit 104 new to network 100 is initially ranged. Maintenance ranging is used to maintain synchronization after acquisition has been completed.

The present invention will be described in reference to a synchronization waveform transmitted upstream from subscriber unit 104 to central access point 102 as a part of the ranging process. The discussion will primarily concern use of this waveform in acquisition ranging. The synchronization waveform may also, however, be used in the context of maintenance ranging.

The TDMA scheme coordinated by central access point 102 periodically allocates contiguous sets of frames for use by new subscriber units to transmit synchronization waveforms upstream for the purpose of acquisition ranging. Each such contiguous set is referred to as an initial ranging window. The initial ranging window is longer than a single frame to allow for the fact that new subscriber units that have not yet been ranged will not have an accurate understanding of system timing.

Central access point 102 preferably does not allocate each initial ranging window for use by a particular new subscriber unit. Instead any new subscriber unit may transmit during the initial ranging window. There may therefore be contention if multiple new subscriber units attempt to transmit their synchronization waveforms upstream during the same initial ranging window.

If a collision occurs, each colliding subscriber unit tries again M number of initial ranging windows later. Each subscriber unit independently and randomly selects its own value for M after a collision. The collision is detected at central access point 102 if a significant amount of energy is measured within the initial ranging window but no data forming a part of the expected synchronization waveform may be decoded accurately. When a collision is detected, central access point 102 notifies all subscriber units in a downstream transmission initiated by the MAC protocol entity operating at central access point 102.

The initial ranging process operates as follows. Successive messages from central access point 102 downstream to subscriber unit 104 occur at periodic intervals and include time stamps representing a current time value at the central access point. Subscriber unit 104 adjusts its own clock rate to match the rate of change of the time values in the incoming time stamps.

Once clock rate is synchronized, the next step is synchronization of clock phase and establishment of a round trip propagation delay (RTD) value. Central access point 102 sends a time stamp message at $T^H$. Subscriber unit 104 receives the time stamp and sets it own clock to $T^H$ setting the local clock phase. Subscriber unit 104 transmits a synchronization waveform in an initial ranging window beginning at a time $T^{S1}$ designated in the message from central access point 102. Central access point 102 notes the time of arrival of the synchronization waveform as $T^{H1}$ and computes the RTD to be $T^{H1}-T^{S1}$. Central access point 102 sends the RTD value to subscriber unit 104.

Subscriber unit 104 sets its local time to $T^H$ at a time equivalent to $T^H+RTD/2$ at central access point 102 accounting for the downstream propagation delay experienced by the time stamp message. Any upstream transmission from subscriber unit 104 to central access point 102 experiences an additional delay of RTD/2. Therefore, whenever subscriber unit 104 has been scheduled to transmit data in a particular frame, it transmits at the scheduled time advanced by RTD which is the sum of the difference in clock values and the one way propagation delay.

It will been seen that an important part of the ranging process is measurement of arrival time of the synchronization waveform by central access point 102. The present invention provides a synchronization waveform whose characteristics facilitate accurate measure of arrival time.

Figure 2:
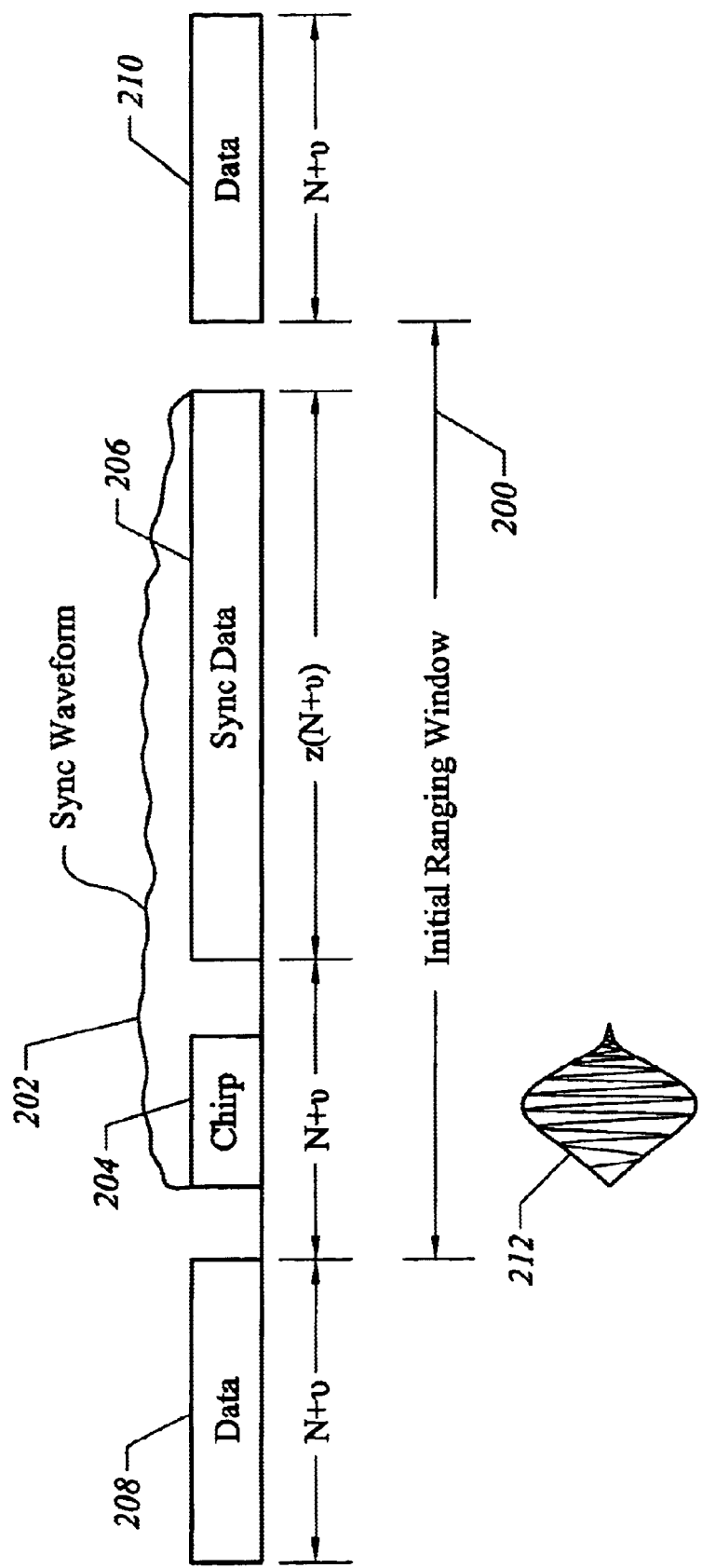
FIG. 2 depicts a synchronization waveform within a series of TDMA frames according to one embodiment of the present invention.

FIG. 2 generally depicts contents of an initial ranging window within a TDMA data stream. One of subscriber units 104 transmits a synchronization waveform 202 including a special chirp waveform 204 and a data waveform 206. Synchronization waveform arrival time computations are based on analysis of chirp waveform 204 as received. Synchronization data waveform 206 carries data required by the MAC layer protocol. In MCNS, synchronization data waveform 206 includes a MAC layer address of the subscriber unit generating the synchronization waveform. In an alternative embodiment, synchronization data waveform 206 is omitted.

Synchronization data waveform 206 may be formed according to any one of a number of modulation schemes in order to carry the synchronization data. In one embodiment, the synchronization data consists of QAM symbols. In an alternative embodiment, OFDM (Orthogonal Frequency Division Multiplexing) is employed to carry the synchronization data. Data frames 208 and 210 represent upstream data transmissions by subscriber units which have been allocated the respective frames for their transmissions. Each data frame includes N data symbols and v symbols of preamble. In systems employing OFDM the v symbols are used for a cyclic prefix. The quantity v should be greater than or equal to a maximum expected duration of an impulse response of the channel from any subscriber unit 104 to central access point 102.

Chirp waveform 204 is contained within a time slot having a duration of N+v symbol periods. Synchronization data waveform 206 occupies an integer number of time slots each having a duration of N+v symbol periods. In FIG. 2 synchronization data waveform 206 includes two such time slots.

A waveform diagram 212 very roughly represents the envelope and instantaneous signal level of chirp waveform 204. Chirp waveform 204 has excellent autocorrelation characteristics to facilitate accurate measurement of its arrival time at central access point 102. Chirp waveform 204 is also well confined in the frequency domain.

Chirp waveform 204 represents a product of a windowing waveform and a cyclic interpolation of a baseband chirp waveform. The interpolation operation and windowing waveform provide good spectral confinement of synchronization waveform 202. As described below, the cyclic interpolation need not be performed explicitly.

The number of samples in the baseband chirp waveform is $L_{wfm}$. The cyclically interpolated chirp has $c_i * L_{wfm}$ baseband samples where $c_i$ is the interpolation factor. Cyclic interpolation is described in Bracewell, *The Fourier Transform and its Applications*, ($2^{nd}$ Ed. Revised 1986) at pp. 362–370, the contents of which are herein incorporated by reference. Chirp waveform 204 can be described by the expression, $$z(n) = e^{j\phi}(n)w(n)$$

where $$n = 0 \ldots (c_i)(L_{wfm}) - 1,$$

$$\phi = \frac{n^2 \pi}{c_i^2 L_{wfm}}$$

and, $$w(n) = \text{window function}$$
$$= 1 - \cos\frac{2\pi n}{c_i L_{wfm}}$$

It can be seen that the cyclic interpolation need not be performed explicitly but is inherent in the expressions defining $e^{j\phi}$. The window function may be omitted at the expense of some spreading of the chirp waveform spectrum. Chirp waveform 204 is padded with zeros on both sides to fill up the first N+v symbols of initial ranging window 200.

Figure 3:
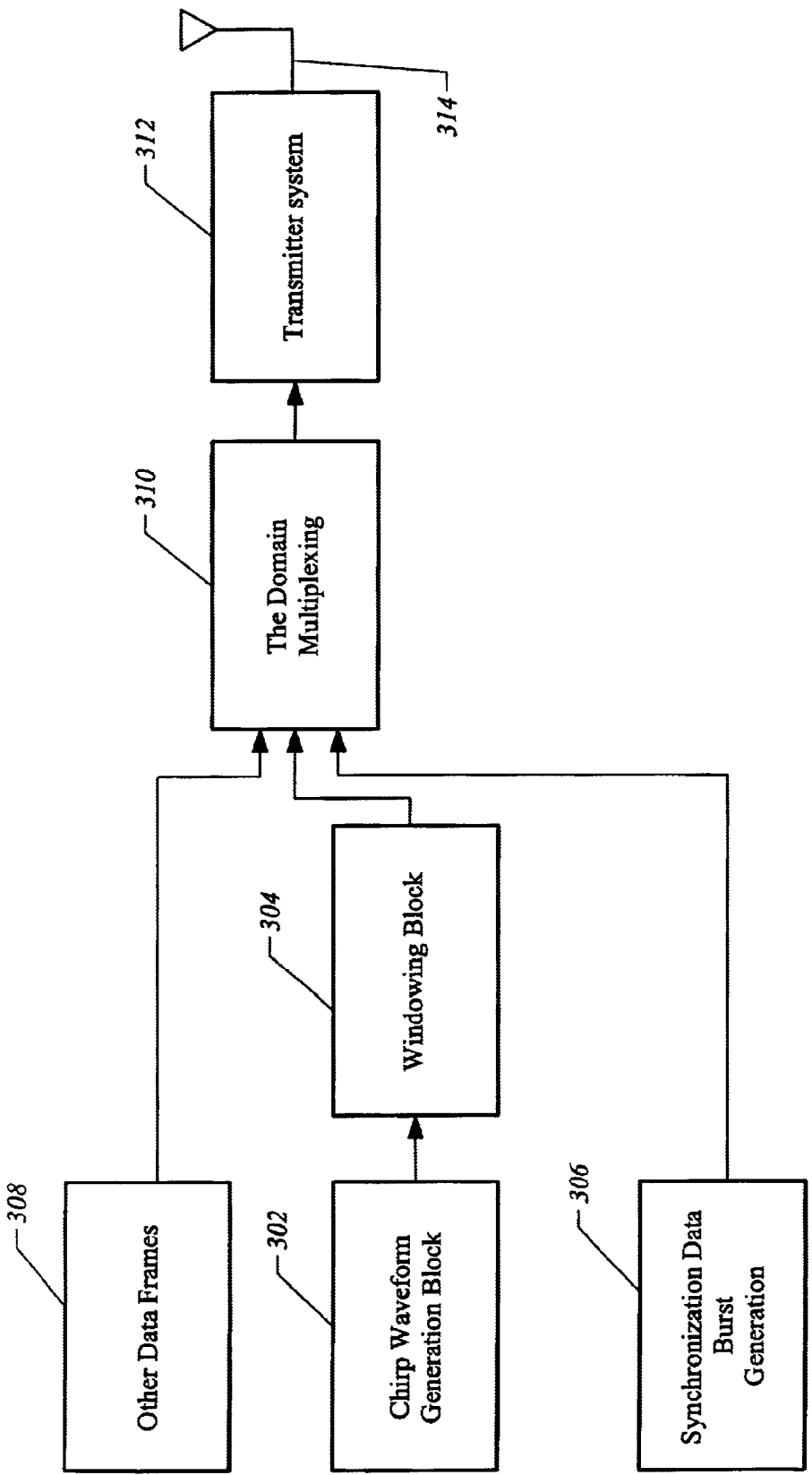
FIG. 3 depicts a system for generating and transmitting a series of TDMA frames including a TDMA frame that includes the synchronization waveform of FIG. 2.

FIG. 3 depicts the generation of waveforms within initial ranging widow 200 and how they are combined with other upstream data transmissions. The components of FIG. 3 would typically be included within each of subscriber units 104. A chirp waveform generation block 302 generates the complex exponential, $e^{j\phi}$. A windowing block 304 multiplies the complex exponential waveform by w(n). In one embodiment, chirp waveform generation block 302 and windowing block 304 are together implemented as a time-indexed look up table. A synchronization data waveform generation block 306 generates synchronization data waveform 206 including any data necessary to identify subscriber unit 104 to central access point 102. Another data frame generation block 308 generates data bursts such as data bursts 208 and 210 that include general data to be transmitted upstream from subscriber unit 104 to central access point 102.

A time domain multiplexing block 310 positions the data frames, synchronization data waveform 206 and chirp waveform 204 in the time domain. Time domain multiplexing block 310 operates so that chirp waveform 204 and synchronization data waveform 206 are appropriately positioned within an initial ranging window as defined by the MAC protocol. Time domain multiplexing block 310 accepts data from block 308 during TDMA frames allocated to subscriber unit 104 for upstream data transmission.

A transmitter system 312 converts the symbols output by time domain multiplexing block 310 to analog, upconverts the analog signal to an intermediate frequency, performs appropriate filtering and amplification at the intermediate frequency, upconverts the intermediate frequency signal to the RF transmission frequency, amplifies and filters the RF signal, and then transmits via an antenna 314.

Figure 4:
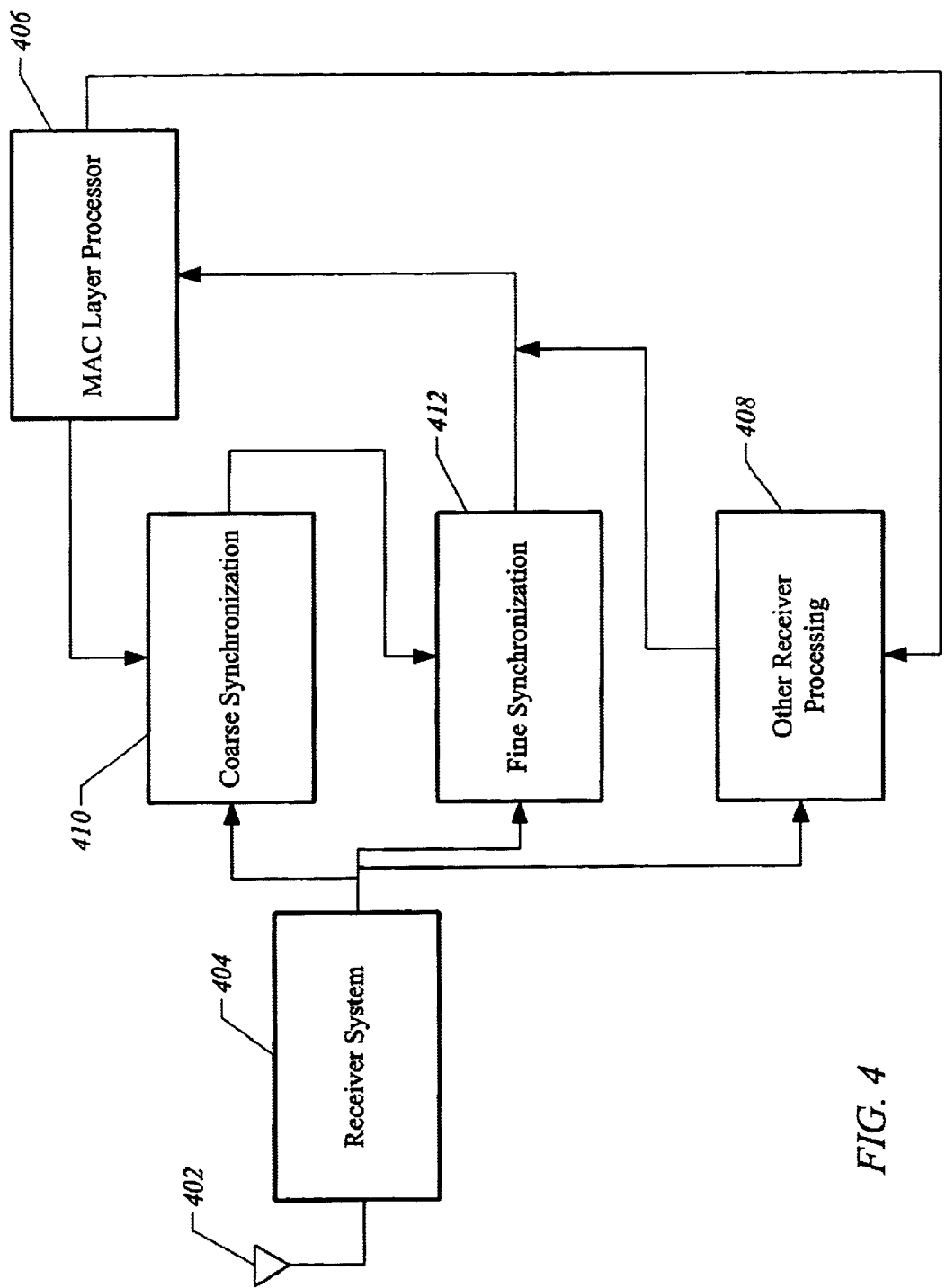
FIG. 4 depicts a system for synchronizing timing based on the synchronization waveform of FIG. 2.

FIG. 4 is a top-level diagram of a system for determining the arrival time of synchronization waveform 202. The components depicted in FIG. 4 would typically be included within central access point 102.

Signals received from one or more of subscriber units 104 are incident on an antenna 402. Receiver system 404 converts the received signals to an intermediate frequency, filters and otherwise processes the intermediate frequency signal, converts the intermediate frequency signal to baseband, and digitizes the baseband signal. A MAC layer processor 406 defines the times when upstream data transmissions are expected from various ones of the subscriber units 104 and further defines the initial ranging windows where synchronization waveforms are expected. A receiver processing block 408 processes the contents of synchronization data waveform 206, extracting, for example, the MAC layer address of the particular subscriber unit generating synchronization waveform 202. This information is forwarded to MAC layer processor 406.

Determining the arrival time of chirp waveform 204 is the job of a coarse synchronization block 410 and a fine synchronization block 412. Coarse synchronization block 410 determines an approximate arrival time of chirp waveform 204. Coarse synchronization block 410 looks for chirp waveform 204 within a time span determined by MAC layer processor 406 and determines an approximate arrival time or range of arrival times. Fine synchronization block 412 determines a more exact estimate of the arrival time of chirp waveform 204. Fine synchronization block 412 makes use of the coarse estimate generated by coarse synchronization block 410 in arriving at its much more accurate estimate. Without the coarse estimate, fine synchronization block 412 would have to search a much greater range of alignments at a great cost in system complexity.

The coarse arrival time estimate makes use of both chirp waveform 204 and synchronization data waveform 206. The fine arrival time estimate uses only chirp waveform 204.

Figure 5:
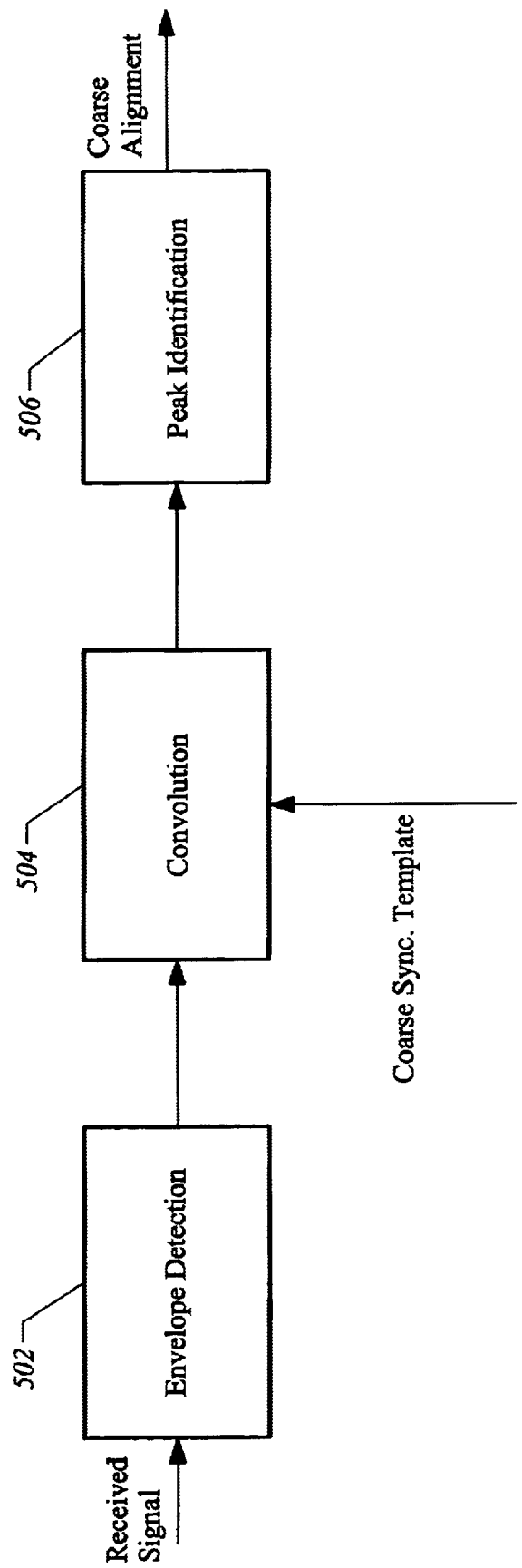
FIG. 5 depicts a system for establishing coarse synchronization according to one embodiment of the present invention.
Figure 6:
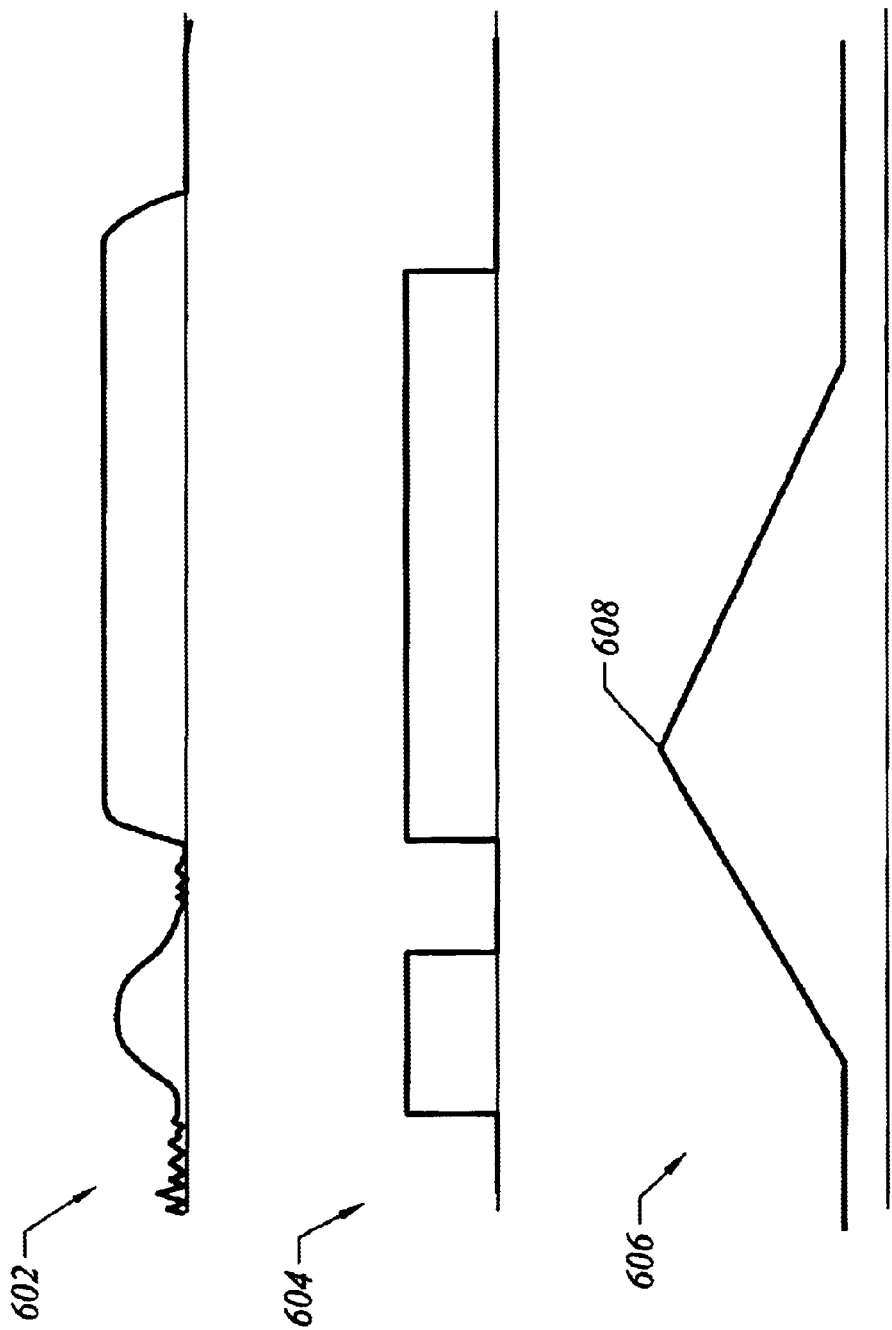
FIG. 6 depicts waveforms illustrating coarse synchronization according to one embodiment of the present invention.

FIG. 5 depicts the internal operation of coarse synchronization block 410. FIG. 6 illustrates various waveforms useful in explaining the operation of coarse synchronization block 410. The signal received during initial ranging window 200 is input to an envelope detection block 502 which detects an envelope of the signal power received during the window. A depicted waveform 602 represents an envelope of a received synchronization waveform 202 including both chirp waveform 204 and synchronization data waveform 206. A convolution block 504 convolves received envelope 602 with a coarse synchronization template 604. The range over which the convolution is performed is determined by the expected arrival time of synchronization waveform 202 as determined by MAC layer processor 406.

A convolution output signal 606 will have a peak 608 corresponding to a best alignment between template waveform 604 and envelope waveform 602. A peak identification block 506 determines the peak of convolutional output waveform 606. The position of this peak represents a coarse estimate of the arrival time of synchronization waveform 202.

Figure 7:
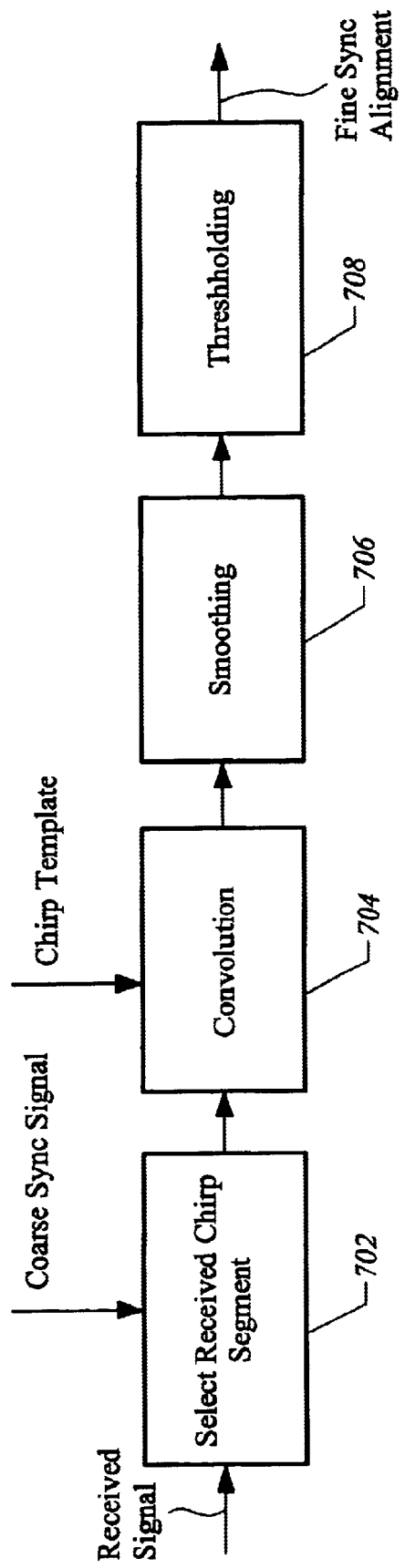
FIG. 7 depicts a system for establishing fine synchronization according to one embodiment of the present invention.

FIG. 7 depicts the internal operation of fine synchronization block 412. A selection block 702 isolates a segment of the received signal where chirp signal 204 is expected based on the coarse synchronization estimate generated by coarse synchronization block 410. A convolution block 704 then convolves the received chirp waveform with a chirp template waveform. The convolution is performed over a range of 2*v alignments centered on the coarse synchronization estimate. The availability of the coarse synchronization estimate greatly saves on the number of computations needed to develop the output of convolution block 704. The chirp template waveform is simply the complex conjugate of the time-reversed chirp waveform as transmitted.

In one embodiment, this convolution is performed as a multiplication in the frequency domain. The selected chirp segment is converted to the frequency domain by use of an FFT procedure. The frequency domain representation of the chirp template waveform is available in a look up table. Convolution block 704 multiplies the frequency domain chirp segment by the frequency domain chirp template. The convolution result is then converted into the time domain by use of the IFFT. The output of convolution block 704 is a signal representing the squared magnitude of the convolution result.

A smoothing block 706 low pass filters the output of convolution block 704 by convolving that output further with a smoothing filter impulse response. The smoothing filter impulse response consists of a series of $N_{smooth}$ 1's. In one embodiment, $N_{smooth}=5$.

A thresholding block 708 identifies peaks in the output of smoothing block 706 that represent alignment of the chirp template to the received chirp waveform. The operation of thresholding block 708 will be described in part with reference to FIG. 8. Thresholding block 708 seeks to identify peaks representing alignment and to discard false peaks resulting from noise.

Figure 8:
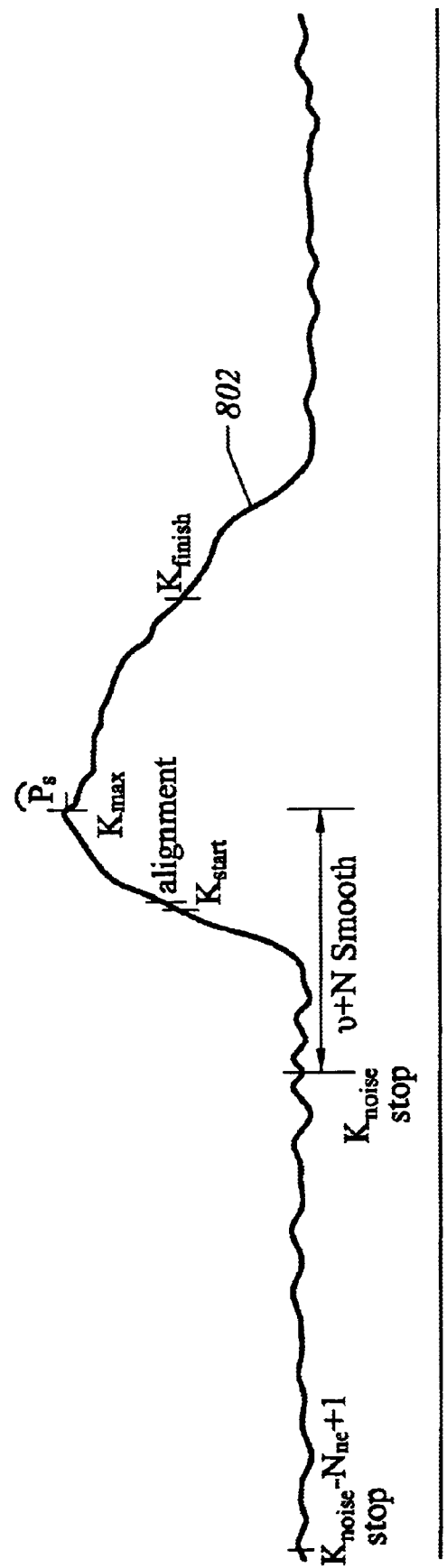
FIG. 8 depicts a waveform illustrating fine synchronization according to one embodiment of the present invention.

FIG. 8 depicts a smoothed convolution magnitude waveform 802. Waveform 802 has a peak having amplitude $\hat{P}_S$. This peak is considered to represent an alignment between the chirp template waveform and the received chirp waveform only upon satisfaction of a signal to noise ratio criterion. In one embodiment, the noise level is determined to be $$\hat{P}_n = \frac{1}{N_{ne}} \sum_{K_{stop}-N_{ne}+1}^{K_{stop}} V(k)$$

where V(k) represents the input to thresholding block 708, $K_{stop}$ (designated in FIG. 8 as $K_{noise\ stop}$) defines the end of an interval of waveform 802 that is known to represent noise, and where $N_{ne}$ represents the number of samples in this known noise interval. The signal in the interval between $K_{stop}-N_{ne}+1$ and $K_{stop}$ is known to be noise because it corresponds to the dead time between the end of data frame 208 and the beginning of chirp waveform 204. In one embodiment, $K_{stop}=K_{max}-v-N_{smooth}$ where $K_{max}$ is the position of the peak.

In one embodiment, the criterion for determining that a peak qualifies as an indication of alignment between the chirp waveform and the template waveform is that the peak amplitude, $\hat{P}_S$ is greater than or equal to $\hat{P}_n*\gamma$ where $\gamma$ is an SNR threshold. For example, $\gamma$ may be such that the peak is qualified if it is 10 dB above the noise floor. In an alternative embodiment, the threshold is $\min(\hat{P}_n\cdot\gamma,(\hat{P}_S\cdot\hat{P}_n)^{1/2})$. The second threshold provides for reduced probability of missing a peak under low signal to noise ratio conditions at the expense of a higher probability of false detection of a peak.

The threshold then serves as the basis for determining the time value representing the beginning of the burst. In one embodiment, the beginning of the burst is determined to be the time value where waveform 802 first rises above the threshold. A more accurate technique for determining the burst takes into account the effects of windowing and application of the smoothing filter. An initial estimate of the beginning of the burst is determined to be where waveform 802 first rises above the threshold, $K_{start}$. An initial estimate of the end of the burst is determined to be where waveform 802 last descends below the threshold, $K_{finish}$. A refined estimate of the beginning of the burst is then determined to be:

$$\max\left(K_{start}, \frac{K_{finish}-K_{start}}{2} - \frac{v}{2}\right)$$

This position is then the fine synchronization alignment used to determine interburst boundaries.

The same synchronization waveform is used for maintenance ranging as well. In determining the arrival time of a synchronization waveform during maintenance ranging, however, only the fine synchronization process is employed. It is assumed that the coarse synchronization is already known from previous ranging operations and has not changed significantly.

It is understood that the examples and embodiments described herein are for illustrative purposes only and at various modifications or changes in light thereof will be suggested to persons skilled in the art and are to be included in the spirit and purview of this application and scope of the appended claims and their full scope of equivalents. For example, the present invention may be applied to wireline systems. All publications, patents, and patent applications cited herein are hereby incorporated by reference.

What is claimed is:

1. In a digital communication system comprising a first node and a second node, a method for operating said first node to synchronize timing of a second node to timing of said first node, the method comprising:

receiving a series of time stamps from said second node indicating current time at said second node;

adjusting clock rate at said first node to match rate of change of time values in said time stamps;

transmitting a synchronization waveform comprising a chirp waveform from said first node to said second node; and transmitting data from said first node before said synchronization waveform and after said synchronization waveform.

2. The method of claim 1 wherein said chirp waveform comprises a signal represented by an expression, $$Z(n) = e^{j\frac{n^2\pi}{c_i^2 L_{wfm}}} w(n)$$

where $c_i$; and $L_{wfm}$ are constants and w(n) is a windowing function.

3. The method of claim 1 wherein said digital communication system operates in accordance with a MAC protocol that reserves a time slot for transmission of said chirp waveform.

4. The method of claim 1 wherein said synchronization waveform further comprises a data waveform.

5. In a digital communication system comprising a first node and a second node, a method for synchronizing timing of said second node to timing of said first node, said method comprising:

receiving a synchronization waveform from said first node, said synchronization waveform comprising a chirp waveform;

determining an alignment of said chirp waveform to a template chirp waveform to synchronize timing of said second node to timing of said first node;

forming an envelope of signal power of said synchronization waveform as received from said first node; and aligning said envelope to a template envelope to determine a coarse timing to limit a range of alignments to be tested when determining said alignment of said chirp waveform to said template chirp waveform.

6. The method of claim 5 wherein determining said alignment comprises:

convolving said chirp waveform with said template chirp waveform to form a correlation signal.

7. The method of claim 6 wherein convolving comprises:

multiplying a frequency domain representation of said chirp waveform by a frequency domain representation of said template chirp waveform.

8. The method of claim 5 wherein determining said alignment further comprises:

detecting at least one peak of said correlation signal; and qualifying said peak as an indication of alignment between said chirp waveform and said template chirp waveform based on a signal to noise ratio criterion.

9. The method of claim 8 wherein determining said alignment further comprises:

smoothing said correlation signal prior to detecting.

10. In a digital communication system comprising a first node and a second node, apparatus for transmitting a synchronization signal from a first node to a second node, said apparatus comprising:

a synchronization system that receives a series of time stamps from said second node indicating current time at said second node and adjusts clock rate at said first node to match rate of change of time values in said time stamps;

a chirp waveform generation block that generates a chirp waveform; and a transmitter system that transmits a synchronization waveform to said second node, said synchronization waveform comprising said chirp waveform.

11. The apparatus of claim 10 further comprising:

a windowing block that applies a frequency domain windowing operation to said chirp waveform to contain a spectrum of said chirp waveform within a spectral mask.

12. The apparatus of claim 10 further comprising:

a time domain multiplexer that combines said chirp waveform and a data waveform to form said synchronization waveform.

13. The apparatus of claim 10 wherein said synchronization waveform is transmitted within a MAC layer slot reserved for transmission of synchronization information.

14. In a digital communication system comprising a first node and a second node, apparatus for synchronizing timing of said second node to timing of said first node, said apparatus comprising:

a receiver system at said second node that receives a synchronization waveform from said first node, said synchronization waveform comprising a chirp waveform;

a synchronization system at said second node that synchronizes timing of said second node to said chirp waveform; and a coarse synchronization block within said synchronization system that forms an envelope of signal power of said synchronization waveform and aligns said envelope to a template envelope to determine a course timing.

15. The apparatus of claim 14 wherein said synchronization system comprises:

a convolver that convolves said chirp waveform with a chirp template waveform to form a correlation signal.

16. The apparatus of claim 15 wherein convolver convolves by multiplying frequency domain representations of said chirp waveform and said chirp template waveform.

17. The apparatus of claim 16 wherein said synchronization system further comprises:

a smoothing block that smoothes said correlation signal.

18. The apparatus of claim 17 wherein said synchronization system further comprises:

a thresholding block that detects at least one peak of said correlation signal and qualifies said peak based on a signal to noise ratio criterion, a qualified peak indicating an alignment point between said chirp waveform and chirp template waveform.

19. The apparatus of claim 15 wherein said coarse synchronization block uses said coarse timing to select said chirp waveform for input to said convolver.

20. The apparatus of claim 14 wherein said chirp waveform comprises a signal represented by an expression, $$Z(n) = e^{j\frac{n^2\pi}{c_i^2 L_{wfm}}} w(n)$$

where $c_i$; and $L_{wfm}$ are constants and w(n) is a windowing function.

* * * * *